June 25, 1963  E. H. SCHULTZ, JR  3,094,881
SHEAVE
Filed Feb. 27, 1961

INVENTOR.
Edward H. Schultz, Jr.
BY
Olson & Trexler
attys.

United States Patent Office 3,094,881
Patented June 25, 1963

3,094,881
SHEAVE
Edward H. Schultz, Jr., Chicago, Ill., assignor to The Nagel-Chase Manufacturing Company, Chicago, Ill., a corporation of Illinois
Filed Feb. 27, 1961, Ser. No. 91,738
5 Claims. (Cl. 74—230.8)

This invention relates generally to sheaves and especially to lightweight sheaves formed of a sheet material such as sheet metal.

In the past, lightweight sheaves formed of two sheet material discs have been made rigid by joining the discs near the pulley groove and by spacing them apart adjacent the hub. This spacing of the sheet material discs has been accomplished generally by interposing a hollow cylindrical collar or spacer between the discs at the hub. However, this arrangement has proved costly because of the added part, namely the spacer. Moreover, additional labor has been involved in assembling the spacer.

Therefore, a general object of the present invention is to provide a new and improved sheave of the lightweight type.

Another object of the invention is to provide a highly rigid construction for sheet material sheaves.

Yet another object of the invention is to provide a strong yet inexpensive sheave.

Additional objects and features of the invention pertain to the particular structure and arrangements whereby the above objects are attained.

A structure in accord with the invention includes a cylindrical hub having spaced apart, peripheral grooves, one of the grooves having a radially inwardly tapering conical portion; a first sheet material member secured to the hub at the groove having a conical portion, the member having an axially extending portion which fittingly engages the floor of the groove; and a second sheet material member secured to the hub at a different groove, the second member being joined to the first member at matching surfaces radially outwardly of the hub, the members further having diverging portions radially outwardly of the common juncture for defining a pulley groove, the members forming between the hub and their common juncture a hollow quadrilateral bounded at one location by the hub, bounded at another location by an arc defined by the first member and bounded at still another location by a rectilinear figure defined by the second member.

The invention, both to its structure and mode of operation, will be better understood by reference to the following disclosure and drawing forming a part thereof, wherein.

Figure 1:
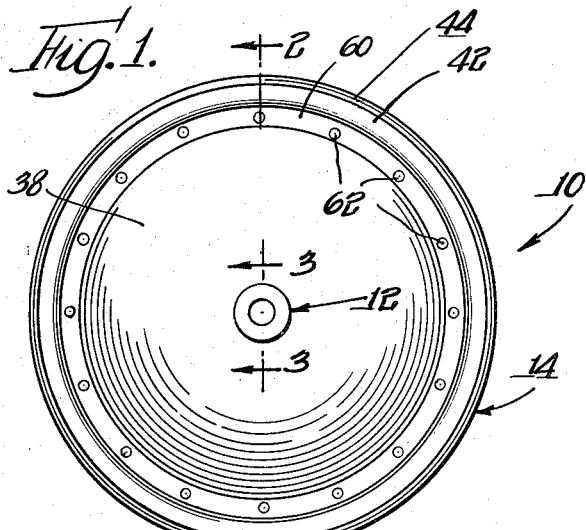
FIG. 1 is a side elevational view of a sheave constructed in accordance with the invention.

Referring now in detail to the drawing wherein a single embodiment of the invention has been shown, a sheave indicated generally by the numeral 10 will be seen to comprise a hub 12 and two sheet material members, members 14 and 16. In specific embodiments of the invention, the members 14 and 16 have been usefully fabricated from a sheet metal such as sheet steel.

Figure 5:
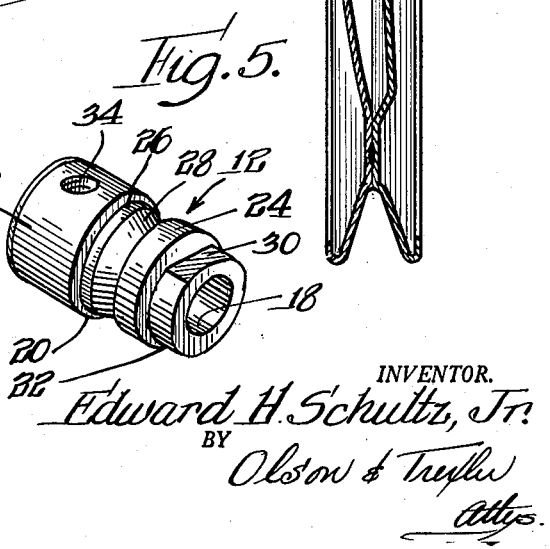
FIG. 5 is a perspective view of the hub employed in the sheave of the invention.

With particular reference to FIG. 5, the hub 12 will be seen comprising a cylindrical element having an axial bore 18. Two external, annular grooves, grooves 20 and 22, are formed on the hub 10 spaced apart by a collar-defining section 24. The floor of groove 20 incorporates a cylindrical portion 26 and a radially inwardly tapering, frusto-conical portion 28. Groove 22, on the other hand, is fashioned with a chord-like flat 30; and it will be noted that, before assembly, groove 22 opens axially as well as radially.

Advantageously, hub 12 includes an extension 32; and if desired, a radial bore 34 may be drilled and tapped in the extension 32 so as to receive a set screw for purposes of securing sheave 10 to the shaft which is adapted to pass through the bore 18.

Figure 2:
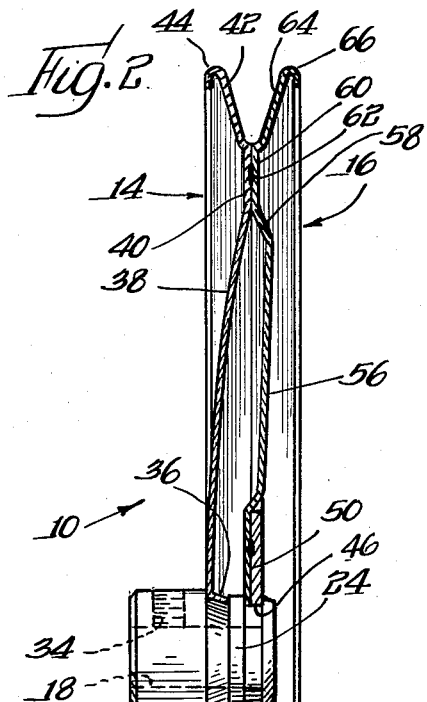
FIG. 2 is an enlarged view taken through the section 2—2 of FIG. 1.

As is well shown in FIG. 2, the sheet material member 14 includes an axially extending portion or collar 36 which is intended to cooperate with groove 20 in a manner to be described more fully hereinafter. Radially outwardly of portion 36, the member 14 includes a spherically shaped section 38, a flat section 40 and a diverging portion 42. Portion 42 defines one side of the pulley groove and terminates in a rim or lip 44.

Similarly, the member 16 is fashioned with a central aperture 46, a chord-like projection 48 extending into the aperture 46 fittingly to engage the flat 30 of groove 22. Member 16 also includes a flat annular section 50 radially outwardly of aperture 46. Section 50 is advantageously reinforced by a washer 52 which is secured to the section 50 by weldments 54 and which has a central aperture coincident with the aperture 46. Radially outwardly of section 50, the member 16 includes two intersecting, reversely tapering, frusto-conical sections, sections 56 and 58; and radially outwardly of section 58, the member 16 includes a flat section 60 which confronts the section 40 of member 14 and which is secured thereto as by weldments 62. Radially outwardly of section 60, the member 16 includes a diverging section 64 which defines the other side of the pulley groove and which terminates in a rim 66.

Thus, it will become apparent that the members 14 and 16 are spaced apart at the hub 12 by the width of the collar 24 and by the length of the axially extending portion 36. In addition, the members 14 and 16 are affixed together radially outwardly of the hub at the juncture of the sections 40 and 60. More specifically, the members 14 and 16 define a radial cross-section having the form of a hollow quadrilateral bounded on one side by the hub 12, bounded on another side by the spherical section 38 of member 14 and bounded at the final locations by the rectilinear figure defined by the conical sections 56 and 58 of member 16. This arrangement has proved to give a substantial degree of rigidity to the sheave and permits the use of lighter gauge materials without sacrificing rigidity.

It is also important to point out that the members 14 and 16 are non-rotatably affixed to the hub 12 by means of the projection 48 engaging the flat 30.

Figure 4:
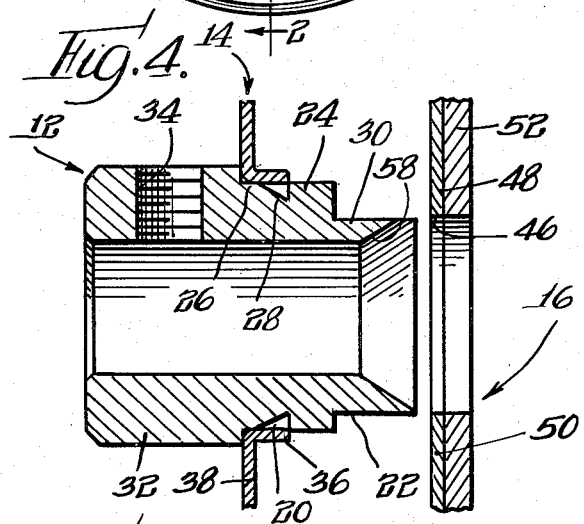
FIG. 4 is a view similar to the showing of FIG. 3 but illustrating assembly of the parts.
Figure 3:
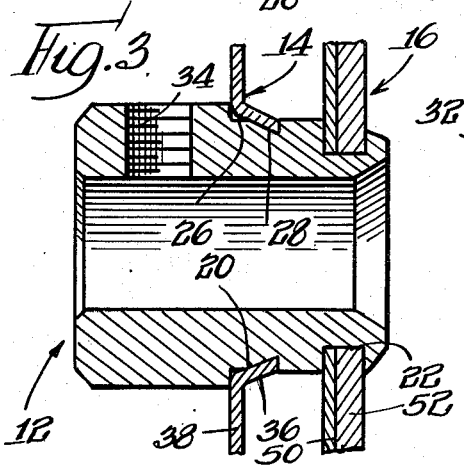
FIG. 3 is an enlarged view taken through the section 3—3 of FIG. 1.

As is well shown in FIG. 3, the axially extending portion 36 intimately engages the frusto-conical portion 28 of the floor of groove 20; and one useful method of insuring this relationship involves forming the section 36 initially in a cylindrical form as is illustrated in FIG. 4. Thereafter, the member 14 is assembled to the hub 12, the section 36 being subsequently spun or formed against the frusto-conical portion 28 of the floor of groove 20. This latter condition is shown in FIG. 3, and it will be noted that the forming operation draws or extrudes the cut edge of section 36 into intimate contact with the side wall of the groove.

Completion of the assembly of the sheave 10 thereafter requires fitting of the member 16 to the hub with aperture 46 engaging the groove 22. Since the groove 22 opens axially as well as radially, member 16 is easily slipped in place. With the member 14 secured as has been described immediately hereinabove and with the member 16 assembled to the hub as well, the members 14 and 16 are secured to each other by means of the weldments 62. Next, the free end of the hub which is associated with groove 22 is formed over the edge of aperture 46 in the manner indicated in FIG. 3. The free end of the hub 12 is advantageously fashioned with a conical counterbore 58 to facilitate this latter operation; and with the end of the hub formed over in this manner, the member 16 will be effectively locked in place in the groove 22.

While a particular embodiment of the invention has been shown and described, it is to be understood, of course, that the invention is not limited thereto since many modifications may be made; and it is, therefore, contemplated to cover by the appended claims any such modifications as fall within the true spirit and scope of the invention.

The invention is claimed as follows:

1. A sheave comprising a hub having spaced apart peripheral grooves having floor portions separated by a peripheral collar portion providing collar-defined edges of said grooves, first and second sheet material members mounted on said hub, the first member having an axially extending portion terminating in an edge facing in the direction of the second member and engaging the floor and collar-defined edge of one of said grooves, the second member being mounted in the other said groove and in engagement with the collar-defined edge thereof and having a connection with the first member radially outwardly of said hub, the said members having diverging portions radially outwardly of the said connection therebetween to define a pulley groove.

2. A sheave as claimed in claim 1, wherein the groove receiving the axially extending portion on the first member is provided with a conical floor portion to which the said axially extending portion is conformed.

3. A sheave as claimed in claim 1, wherein the floor of the groove receiving the second member includes a chord-like flat in engagement with a chord-like projection on the said second member.

4. A sheave as claimed in claim 1, wherein the said members between said hub and the outward connection therebetween define a hollow quadrilateral bounded at one location by an arc and at another location by a rectilinear configuration.

5. A sheave as claimed in claim 1, wherein the second member is provided with an annular recessed portion adjacent the hub and an annular reinforcing washer is secured in said recessed portion.

References Cited in the file of this patent

UNITED STATES PATENTS

| | | |
|---|---|---|
| 726,868 | Corey | May 5, 1903 |
| 1,886,431 | Seelbach | Nov. 8, 1932 |
| 2,738,681 | Schultz | Mar. 20, 1956 |

FOREIGN PATENTS

| | | |
|---|---|---|
| 103,800 | Great Britain | Feb. 8, 1917 |
| 138,808 | Austria | Sept. 25, 1934 |